Oct. 13, 1936.　　　　J. H. HERRERA　　　　2,057,430
INFUSION APPARATUS
Filed July 2, 1935　　　3 Sheets-Sheet 1

Inventor
Juan Hernandez Herrera
By B. Linger, atty.

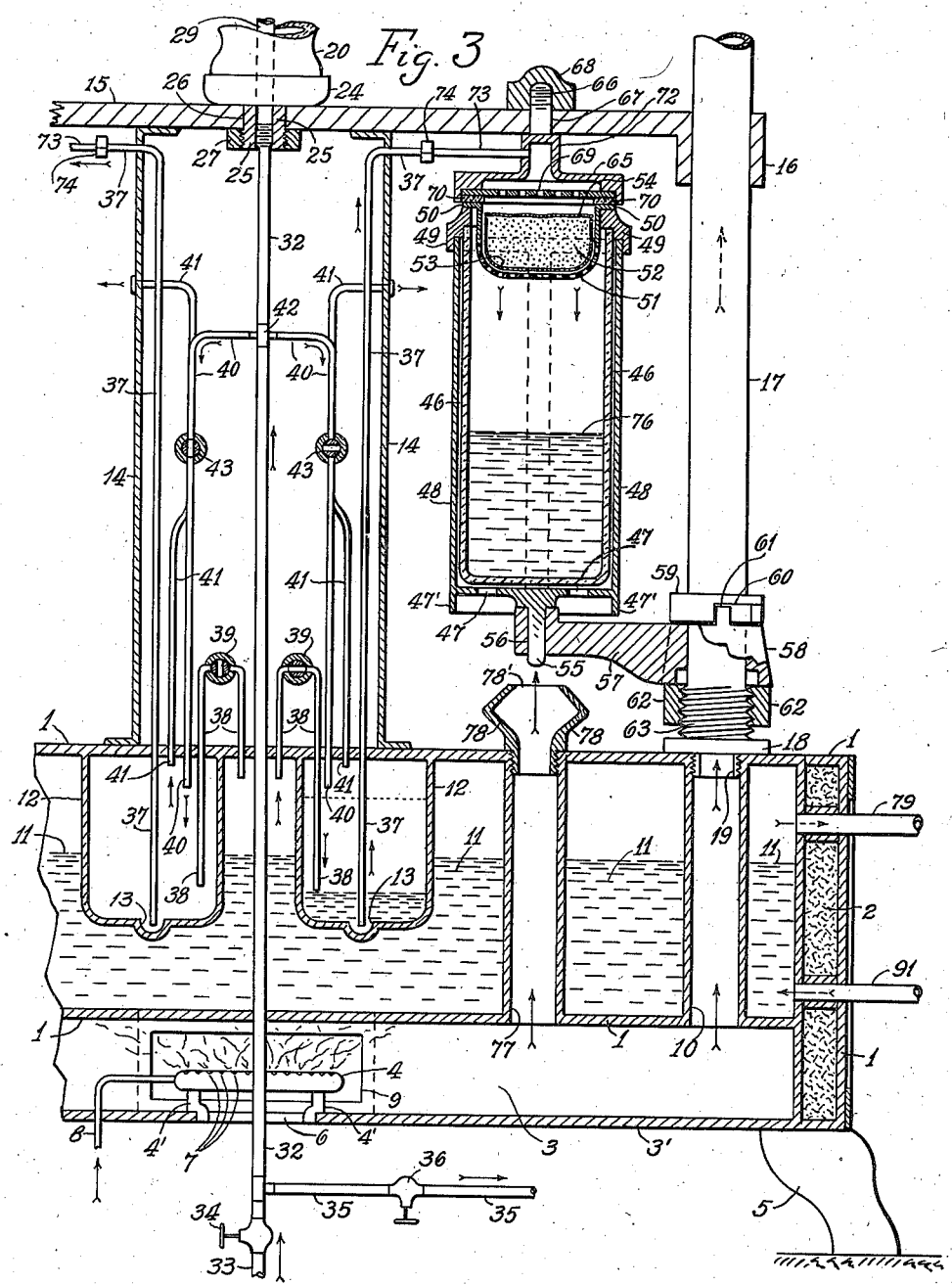

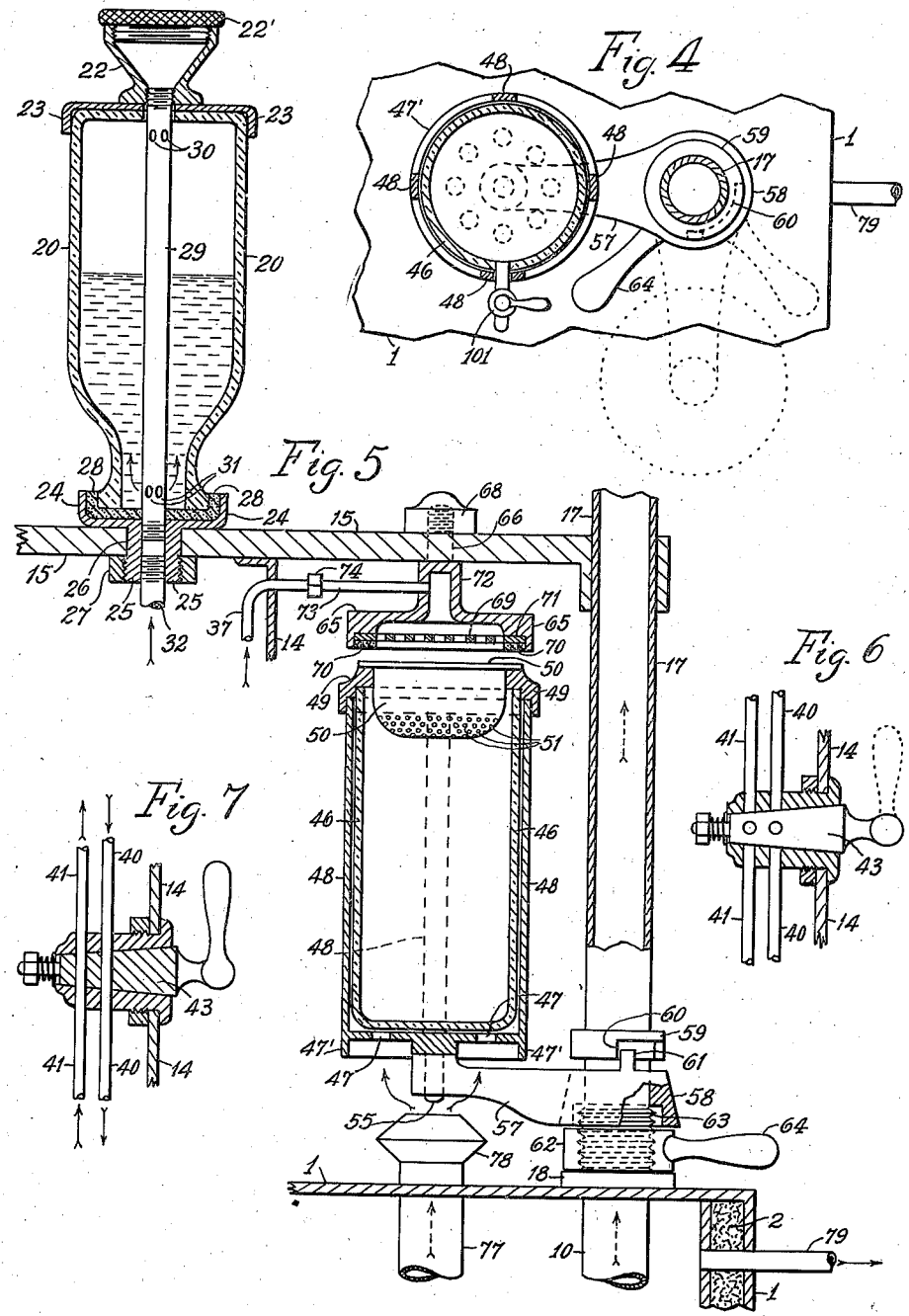

Patented Oct. 13, 1936

2,057,430

UNITED STATES PATENT OFFICE 2,057,430

INFUSION APPARATUS

Juan Hernandez Herrera, Habana, Cuba

Application July 2, 1935, Serial No. 29,551
In Cuba May 30, 1935

12 Claims. (Cl. 53—3)

This invention relates to infusion apparatus particularly adapted to heat water for making instantaneous infusions of coffee, tea, etc., for use in coffee-houses and similar stores, and it has for its object the provision of a heating device of that kind which is composed of a main boiler in which the water forms a bath for a certain number of heaters adapted to quickly heat to ebullition relatively small portions of water for repeatedly supplying them to strainer devices for making infusions of coffee, tea, etc., the feeding and discharge of the liquids being made through pipes and valves without the necessity of contact of the hands with the liquids, whereupon this apparatus is sanitary in every respect and sure and quick in operation, as required for use at coffee-houses and similar public stores.

Another object of the invention is to provide a device for making infusions of coffee, tea, etc., which is coupled with a main heating device and which is oscillatorily and slidably mounted on a vertical shaft to take two positions, one open for the charge of the material from which the infusion is to be made, and another closed for making the infusion in the safest, quickest and cleanest manner, by simply operating the necessary valves on the pipes from the main device.

The invention is described with reference to the figures of the accompanying drawings, of which:

Fig. 3 is an enlarged vertical longitudinal section view, taken on line 3—3 of Fig. 2.

Fig. 4 is a horizontal section view of the strainer in the closed position shown in Fig. 3.

Fig. 5 is a vertical section view similar to Fig. 3, comprising the tank for supplying water to the heaters positioned within the boiler, the latter being omitted, and showing the strainer in a modified position.

Figs. 6 and 7 are two detailed diametral section views showing the water and air two-way valve which is employed for supplying water to each bath heater, in closed and open positions, respectively.

Figure 1:
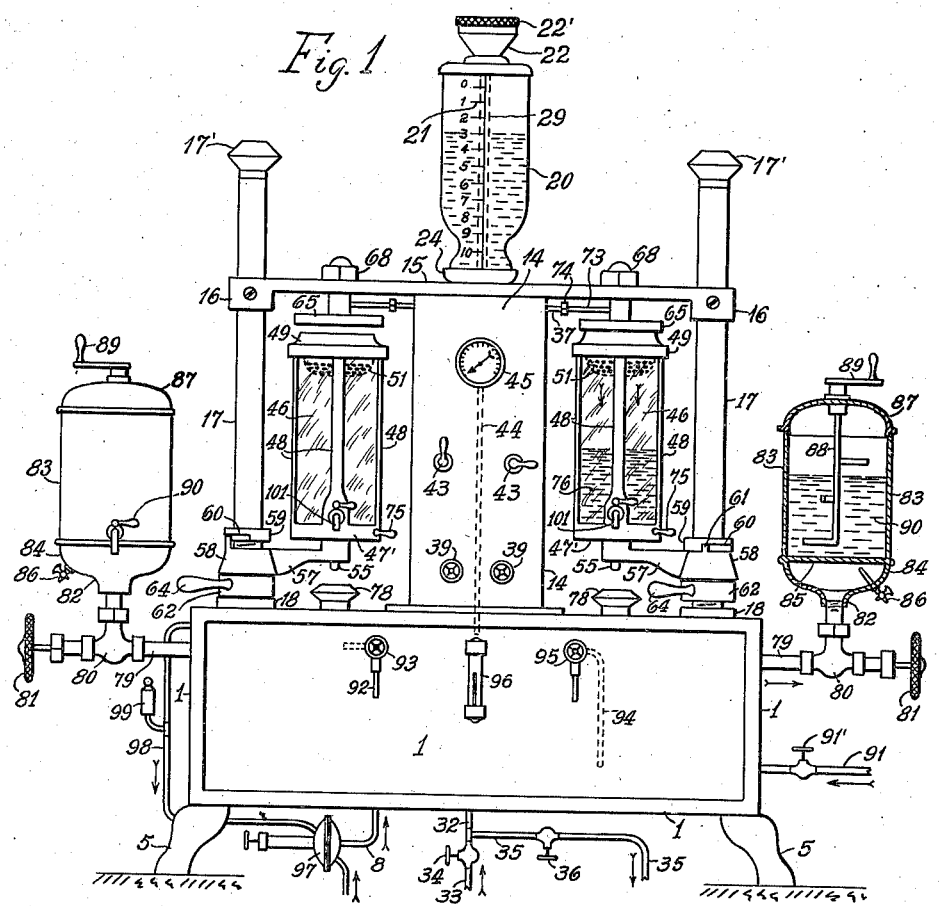
Fig. 1 is a rear elevational view of a complete water-bath heating device constructed according to this invention.

This device is composed of a boiler 1, preferably of rectangular shape in longitudinal and transverse sections having a double side wall with an intermediate space 2 designed to be filled with a heat insulating material, such as asbestos, and a lower hollow space 3 wherein the liquid fuel burner 4 is placed, the whole being supported by legs 5.

The bottom 3' of the lower hollow space 3 presents at its middle portion a big opening 6 in which fits the supporting base 4' of the burner 4 which consists of an annular tube provided with holes 7 at its upper portion and has at one side a manifold 8, there being provided in the fore wall of said hollow space 3 an aperture closed by a door 9 with a glass for examining the work of the burner 4. The combustion gases from the fuel mixture burning in the burner 4 circulate outwardly through vertical chimney flues 10 situated toward the ends of the boiler 1 and through the water 11 occupying the interior of the boiler 1.

Two water-bath steam pressure heaters 12 are fixedly placed at the inner central portion of the boiler 1, which are completely closed and cylindrical in shape and have a plane base having a cup-shaped concavity 13 at the middle portion thereof. Cool water is supplied into said heaters 12 and hot water and air drawn therefrom by means of a system of upwardly extending pipes which are lodged in a vertical box 14, of flattened horizontal rectangular section, which rises above the top of the boiler 1 and which is preferably made of sheet metal at its side walls, its cover being formed by a cast iron plain plate 15 extended beyond the ends of the box 14 in the form of a bridge ending in collars 16 to engage vertical supporting tubes or chimneys 17 rising from the top of the boiler 1 and forming an extension of the chimney flues 10 to lead the combustion gases from the burner 4 as far as possible from the latter. To this end said tubes 17 have at their upper end chimney heads 17' and present at their lower end an annular flange 18 resting directly upon the top of the boiler 1 and an end mouth 19 of reduced section and outer threaded surface to screw into each flue 10.

On the central portion of the bridge 15 is placed the cool water tank for feeding the heaters 12, which may be a glass container 20 in the shape of an inverted bottle on the outer surface of which a scale 21 is stamped or painted to indicate the quantities of water fed for a pre-determined number of cups of infusion desired to be prepared instantaneously in the strainer devices which will be described hereinafter.

Said container 20 presents at its upper portion a cup 22, open below, which has an upper threaded cover for the manual charge of the container, when it be desired, and interposed between the cup 21 and the upper base of the container 20 is a metallic flanged cover 23 for protecting the upper portion of the inverted bottle 20. The joint of the container 20 with the bridge 15 is made tight by means of a base in the shape of a cup 24 provided with a lower cylindrical projection 25 by means of which it is fixed through an opening 26 in the bridge 15 and secured by a lower nut 27 screwed on the threaded portion of said cylindrical projection 25, the lower open portion of the container 20 resting within the cup 24 through the medium of a packing 28, the container 20 being held in that position by means of a tube 29 threaded at both ends and which is screwed at its upper end into the threaded lower mouth of the upper cup 21 and at its lower end into the inner threaded surface of the cylindrical projection 25, the tube 29 thus serving as a connecting bar between the upper cup 21 and the lower cup 24.

Said tube 29 is provided with an annular series of openings 30 at its upper portion and with another annular series of openings 31 at its lower portion, said series of openings 30 and 31 being lodged within the inner space of the container 20 for cool water input and output. To this end, to the lower portion of the threaded inner surface of the cylindrical projection 25 is threadedly connected a vertical tube 32 lodged within the box 14 and passing through the boiler 1 beyond its bottom to engage there with an outer water-pipe 33 provided with a valve 34, said tube 32 being connected above the water-pipe 33 with a branch pipe 35 provided with a valve 36 for use when it be desired to empty the container 20 for cleaning purposes or otherwise.

Within the box 14 is installed a system of pipes and valves for the feeding and discharge of the water-bath heaters 12 aforementioned. For each heater 12 there is a vertical tube 37 which leads from near the bottom of the central cavity 13 of the lower base of each heater, crosses its upper portion and rises through box 14 to near bridge 15 where it passes outwardly therefrom to a connection hereafter noted. Another tube 38 of inverted U shape communicates the upper portion of the inner space of the boiler 1 with the inner space of each heater 12 at about one-fourth of their depth, a valve 39 being interposed on the horizontal branch of each inverted U-shape tube 38 and mounted on the rear wall of the box 14 so that both valves may be conveniently operated by an operator positioned behind the apparatus. Furthermore, there are two other tubes 40 and 41 leading from the upper portion of the inner space of each heater 12, the tube 40 ending in a connection 42 with the vertical cool water feed tube 37 and the tube 41 freely communicating with the atmosphere. Uniting said adjacent tubes 40 and 41 is a two-way valve 43 (Figs. 6 and 7) for controlling the pass through both tubes 40 and 41 at a time, so that upon cool water entering into each heater 12 the air contained within each heater 12 may freely escape direct to the atmosphere. The two-way valves 43 are mounted on the rear wall of the box 14 so that each of them may be conveniently operated by an operator positioned behind the apparatus. In the box 14 is also installed a tube 44 in communication with the upper portion of the inner space of the boiler 1, for its connection with a manometer 45 mounted on the rear wall of the box 14.

Between the central box 14 and the supporting tube 17 situated at each side of the apparatus is arranged a strainer device for making infusions of coffee, tea, etc. Each strainer consists of a glass vessel 46 protected by a metal frame composed of a perforated base 47 from which lead upwardly four metal strips 48 on the upper ends of which fits a metallic ring 49 adapted to retain the upper edge of the vessel 46. Said ring 49 serves as a seat for the horizontal flange of the straining device 50 which is made of metal and has a round base provided with perforations 51 and it is designed to be filled with the material with which the infusion is to be made, such as roasted ground coffee 52, and interposed between the same and the base of the straining device 50, is a filtering cloth 53, the material 52 being covered with another cloth 54 to avoid dispersion of the material 52 upon hot water entering under pressure from a heater 12, as will be explained hereinafter. The perforated base 47 of the frame 48 is provided with a vertical central stem 55 fitting by friction into a hole 56 provided at the free end of a supporting arm 57 which has at its other end a sleeve 58 by means of which it is loosely mounted on the nearest vertical supporting tube 17 between a collar 59 fixed to said tube 17 and having a recess 60 which extends in a 90° circle arch and is designed to slidably receive a projection 61 extending from the upper edge of the sleeve 58, and a nut 62 screwed onto a thread 63 formed on the outer surface of the tube 17 immediately above the flange 18 thereof, the nut 62 being provided with a handle 64 for screwing or unscrewing it on the tube 17 upon rotating it in one direction or the other, whereupon it will raise or lower the sleeve 58 and the supporting arm 57 carrying the frame 48 and the vessel 46, so as to permit respectively, the straining operation or the refilling operation of the strainer 50. The purpose of raising the vessel 46 carrying the straining device 50, for the straining operation, is to permit the strainer 50 to be tightly adjusted with a head 65 fixed on the bridge 15 by means of a threaded stem 66 projecting upwardly from its middle portion and passing through a hole 67 formed through the bridge 15, it being held thereto by means of a nut 68 screwed on the projecting end of the threaded stem 66, and the head 65 which is cylindrical in shape and interiorly hollow, is provided with a perforated metallic disc 69 and a packing ring 70 both lodged in an annular recess 71 formed in the lower edge of the head 65. From the hollow cylindrical portion 72 of the head leads a tube 73 which connects with the tube 37 by a union 74, for the purpose of supplying hot water to the strainer.

Figure 2:
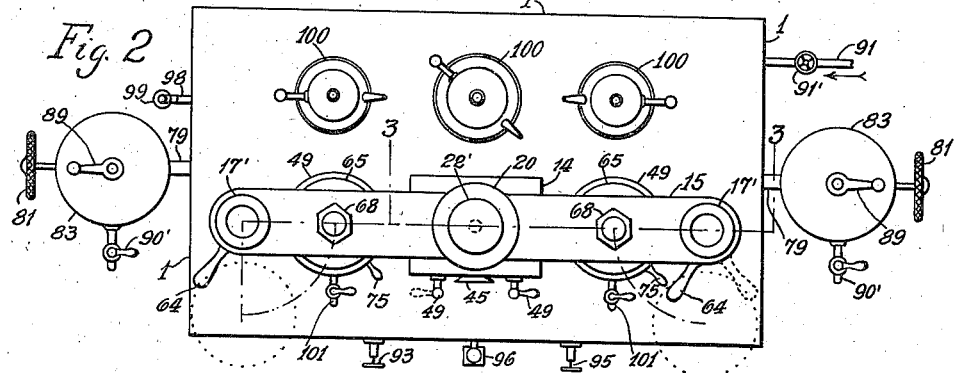
Fig. 2 is an upper plan view of same.

In Figs. 2 and 3 are respectively shown the closed and open positions of the straining device 50 with relation to the stationary head 65, by virtue of the rotating motion manually given to the nut 62 which governs the ascending and descending motion of the supporting arm 57. In addition to this ascending and descending motion, the supporting arm 57 may freely and oscillatorily move about the tube 17 at an angle of 90° as determined by the length of the recess 60 against whose ends the projection 61 of the sleeve 58 is held, which oscillatory motion is given to the frame 48 carried by the supporting arm 57 by grasping it with a handle 75 integral with the annular portion 47, projecting downwardly from the perforated base of the frame 48.

In order to take advantage of the combustion gases from the burner 4 for maintaining in a hot condition the infusion liquid 76 which remains within the vessel 46, a combustion flue 77 is provided at each side and passing through the boiler 1, which has a threaded head 78 which is preferably of a double frusto-conical shape and has an upper opening 78' for leading the combustion gases upwardly in co-axial relation with the stem 66 of the stationary head 65.

The device is also provided with heaters for liquids or liquid mixtures, such as milk, chocolate, etc., by utilizing the steam from the boiler 1, to which end a T union 80, interiorly provided with a valve operable by means of the hand wheel 81, is mounted on a horizontal tube 79 which opens at the vapor space of the boiler 1 and is mounted through the double wall of the latter at each end thereof. On the upper portion of said union 80 is threadedly mounted the lower tubular stem 82 of a cylindrical metal container 83 which has its base in the shape of a spherical cap 84 the inner space of which is separated from the resting space of the cylinder 83 by means of a horizontal partition 85, the inner space of the cap 84 being designed to receive the steam from the boiler 1 through the tube 79 and the tubular stem 82, the condensation water being let out through the drainage tube 86 provided with a valve. The container 83 is closed on top by a detachable cover which is in the shape of a spherical cap 87 adjustable on the edge of the container 83, said cap 87 being provided with a mechanical stirrer 88 which is rotated from the outside by means of a crank 89, to stir the liquid 90 contained within the container 83, and said liquid is let out by means of a valve 90'.

Water is supplied to the boiler 1 from a convenient source through a tube 91 provided with a valve 91', said tube being connected with a point at the lower portion of the boiler 1. The boiler 1 is provided at its rear wall with a steam outlet tube 92 provided with a valve 93, a hot water outlet tube 94 provided with a valve 95, and a level tube 96.

The manifold 8 of the burner 4 may be provided with a self regulator 97 which is in communication with the steam space of the boiler 1 through a tube 98 provided with a safety valve 99, the construction of such self regulator not being described as it does not form a part of this invention.

Portable coffee-pots 100 (Fig. 2) may be arranged on the upper portion of the boiler 1 and thus avail of the heat radiated by the upper metallic portion of the boiler 1.

The operation of the device will be readily understood from the construction described, and for a better comprehension I will only describe the manner in which to handle the valves installed in the box 14 for the operation of the heaters 12 in relation with the straining devices 50. When it be desired to make in one of said heaters an infusion of coffee, tea, etc., the charged strainer 50 is adjusted beneath its respective head 65, the heater 12 to be used is first charged with cool water from the central tank 20, to which end the respective two-way valve 43 will be opened, and cool water from the tank 20 passes toward the heater 12 through tubes 32 and 40, at the same time that the air contained within the heater 12 is driven out through the tube 41. Once the heater 12 is fed with the necessary quantity of cool water, the valve 43 is closed. The cool water thus introduced into the heater 12 boils quickly and, if desired, the ebullition of same may be hastened by introducing into the heater 12 steam direct from the boiler 1 by opening the valve 39, whereupon the steam from the boiler 1 passes into the heater 12 through the U-shaped tube 38. This same steam from the boiler 1 forces out the hot water in the heater 12, through the tube 37, and drives it toward the tube 73 connecting with the stationary head 65. Once in the interior of the latter, the hot water falls by gravity upon the upper cloth 54 and is filtered through it and through the material 52 and the lower cloth 53, thus forming the infusion liquid 76 which occupies the interior of the glass vessel 46, after which the valve 39 is closed and the infusion liquid 76 is withdrawn from the vessel 46 in the amount required by means of the valve 101 installed therein.

It is obvious that the construction details and the shape of the device may be slightly changed, without altering the essential character of the invention which is claimed hereinafter.

What I claim is:

1. An infusion apparatus, comprising a water boiler, a fuel burner located beneath the boiler, means for the escape of the products of combustion from the burner, water heaters placed within the boiler, a cool water feeding tank supported above the boiler, a tube with branches for distribution of cool water from the tank to each of the water heaters, an outlet tube in each of the water heaters for the air contained therein, a two-way valve adapted to control at a time the pass through a branch tube for cool water distribution and the pass through an air outlet tube for each heater, and means operable by valve for admission in each heater of the steam from the boiler and for driving out the hot water from each heater by the same pressure of the steam from the boiler, and an infusion receptacle to which hot water from the heater is delivered.

2. An infusion apparatus, comprising a water boiler, a fuel burner located beneath the boiler, means for the escape of the products of combustion from the burner, water heaters placed in the boiler and fixed to the upper portion of the boiler, a cool water feeding tank supported above the boiler, a tube with branches for distributing cool water from the tank to each of the water heaters, an outlet tube in each of the water heaters for the air contained therein, a two-way valve adapted to control at a time the pass through a branch tube for distributing cool water and the pass through an air outlet tube for each heater, a tube communicating the interior of each heater with the steam space of the boiler, a valve interposed on said tube exteriorly of the boiler, and a tube which reaches almost to the bottom of each heater for driving out the hot water contained in each heater as steam from the boiler is allowed to enter into the heater, and an infusion receptacle to which hot water from the heater is delivered.

3. An infusion apparatus, comprising a water boiler, a fuel burner located beneath the boiler, means for the escape of the products of combustion from the burner, water heaters placed within the boiler and hanging from the upper portion thereof, a cool water measuring tank arranged above the boiler, a tube for supplying cool water from any suitable source to said tank through the lower portion of the latter and which descends downwardly beyond the boiler by passing through it and through the fuel burner, branch tubes connecting with the cool water feeding tube and descending into each water heater, an outlet tube in each of the water heaters for the air contained therein, a two-way valve adapted to control at a time the pass through one of the branch tubes and the pass through an air outlet tube for each heater, a tube communicating the interior of each heater with the steam space of the boiler, a valve interposed on said tube exteriorly of the boiler, and a tube which reaches almost to the bottom of each heater for driving out the hot water contained in each heater as steam from the boiler is allowed to enter into each heater, and an infusion receptacle to which hot water from the heater is delivered.

4. An infusion apparatus, comprising a water boiler, a fuel burner located in a hollow beneath the boiler, means for the escape of the products of combustion from the burner, water heaters placed within the boiler, a cool water feeding tank supported above the boiler, a tube with branches for distributing cool water from the tank to each of the water heaters, an outlet tube in each of the water heaters for the air contained therein, a two-way valve adapted to control at a time the pass through a branch tube for distributing cool water and the pass through an air outlet tube for each heater, valve operating means for admission in each heater of steam from the boiler and for driving out at the same time the hot water contained in each heater by the same pressure of the steam from the boiler, a strainer mounted oscillatorily in horizontal direction and slidably in vertical direction on a vertical support fixed above the boiler, a stationary head which is adapted to tightly close said strainer in the upper position of the latter and which is connected with the hot water outlet tube of a heater for supplying hot water to the strainer.

5. An infusion apparatus, comprising a water boiler, a fuel burner located beneath the boiler, means for the escape of the products of combustion from the burner, two water heaters placed within the boiler and hanging from the central upper portion of the latter, chimney flues fixed on the end portions of the top of the boiler and communicating with the lower hollow thereof for drawing out the combustion gases, a bridge joining the upper portions of the two chimney flues, a water supplying tank supported on the central portion of the bridge, a tube with two branches for distributing cool water from the tank to each of the water heaters, an outlet tube in each of the water heaters for the air contained therein, a two-way valve adapted to control at a time the pass through a cool water distributing branch tube and the pass through an air outlet tube for each heater, valve operating means for admission in each heater of steam from the boiler and for driving out the hot water contained in each heater by the same pressure of the vapor from the boiler, a strainer mounted oscillatorily in horizontal direction and slidably in vertical direction on each chimney flue, a head fixed on the bridge and adapted to tightly close each strainer in the upper position of the latter, and which is connected with the hot water outlet tube of each heater for supplying hot water to the respective strainer.

6. In an infusion apparatus, according to claim 4, a strainer for making instantaneous infusion of liquids, consisting of a glass vessel open on top, a metallic frame for receiving said glass vessel and which has a perforated bottom, a flanged straining device mounted on the upper edge of the glass vessel, a chimney fixed on the boiler, a pivoted arm for the frame of the container and loosely mounted to be rotated on said chimney fixed on the boiler, a collar fixed to the chimney above the supporting arm and which presents a recess in circle area adapted to receive a projection extending from the upper portion of the supporting arm, and a nut screwed on a threaded portion of the chimney beneath the supporting arm and provided with a handle, so that as the container with its frame is in vertical alignment with the upper fixed head upon the nut screwing or unscrewing upon the chimney, the vessel with the straining device may be raised to tightly engage the fixed head, or the strainer may descend out from engagement with the head.

7. An infusion apparatus, comprising a water boiler having a water chamber and a hollow beneath the same, a fuel burner located in said hollow boiler, water heaters arranged within the boiler, a cool water feeding tank supported at a certain height above the boiler, a tube with branches for distributing cool water from the tank to each of the water heaters, an outlet tube in each of the water heaters for the air contained therein, a two-way valve adapted to control at a time the pass through a cool water feeding branch tube and an air outlet tube for each heater, means operated by a valve for admission in each heater of the steam from the boiler and for driving out the hot water contained in each heater by the same pressure of the steam from the boiler, a strainer mounted oscillatorily in horizontal direction and slidably in vertical direction on a vertical support fixed above the boiler, a head fixed and adapted to tightly close the strainer in the upper position of the latter, which is connected with the hot water outlet tube from each heater, and a combustion flue communicating the lower hollow of the boiler with the lower open space of the strainer and being in vertical alignment with the axis of the stationary head so that the combustion gases issuing through said combustion flue may heat the lower base of the strainer in its straining position.

8. In an infusion apparatus, a water boiler having a water chamber and a burner chamber beneath the water chamber, a flue for the escape of products of combustion from said chamber, a burner located in said burner chamber, a water heater in the water chamber, a valve controlled steam duct from said water chamber into said water heater, a water supply reservoir, means to fill said reservoir, valve controlled means to convey water from said reservoir to said heater, an infusion receptacle, and means to conduct water from said water heater to said infusion receptacle under steam pressure.

9. In an infusion apparatus, a water boiler having a water chamber and a burner chamber beneath the water chamber, a flue for the escape of products of combustion from said chamber, a burner located in said burner chamber, a water heater in the water chamber, a valve controlled steam duct from said water chamber into said water heater, a water supply reservoir, means to fill said reservoir, valve controlled means to convey water from said reservoir to said heater, an infusion receptacle located above the boiler and heated by the products of combustion passing through said flue, and means to conduct water from said water heater to said infusion receptacle under steam pressure.

10. In an infusion apparatus, a water boiler having a water chamber and a burner chamber beneath the water chamber, a flue for the escape of products of combustion from said chamber, a burner located in said burner chamber, a water heater in the water chamber, a valve controlled steam duct from said water chamber into said water heater, a water supply reservoir, means to fill said reservoir, valve controlled means to convey water from said reservoir to said heater, an infusion receptacle, means to conduct water from said water heater to said infusion receptacle under steam pressure, said infusion receptacle comprising a support pivoted on a vertical axis, a liquid collecting vessel carried by said support, a fixedly located head to which the water from said water heater is delivered, a strainer carried by said collecting vessel in which strainer the material to be infused is placed, and means to raise and lower said support to bring the mouth of the vessel into operative engagement with said head.

11. In an infusion apparatus, a water boiler having a water chamber and a burner chamber beneath the water chamber, a flue for the escape of products of combustion from said chamber, a burner located in said burner chamber, a water heater in the water chamber, a valve controlled steam duct from said water chamber into said water heater, a water supply reservoir, means to fill said reservoir, valve controlled means to convey water from said reservoir to said heater, an infusion receptacle, means to conduct water from said water heater to said infusion receptacle under steam pressure, said infusion receptacle comprising a support pivoted on a vertical axis, a liquid collecting vessel carried by said support, a fixedly located head to which the water from said water heater is delivered, a strainer carried by said collecting vessel in which strainer the material to be infused is placed, and means to raise and lower said support to bring the mouth of the vessel into operative engagement with said head, said last named means including a stationary member on which said support is pivoted, a nut threaded to said stationary member and on which nut said support rests, and means to turn said nut for raising and lowering said support.

12. In an infusion apparatus, a fixed head, means for delivering hot liquid to said head, a vertical support having a threaded portion, an arm pivotally mounted on said support beneath said head, a frame carried by said arm and having a perforated bottom, a glass vessel carried by said frame, a flanged straining device mounted on the upper edge of the glass vessel, a collar fixed to said vertical support above the supporting arm and having a recess in circle area to receive a projection from the upper portion of said supporting arm, a nut screwed on the threaded portion of said vertical support beneath the supporting arm and provided with a handle whereby said arm may be raised and lowered when said frame is in vertical alignment with said fixed head for purposes described.

JUAN HERNANDEZ HERRERA.